2,600,774

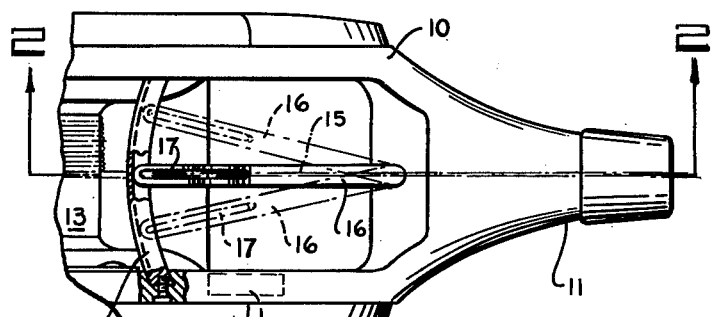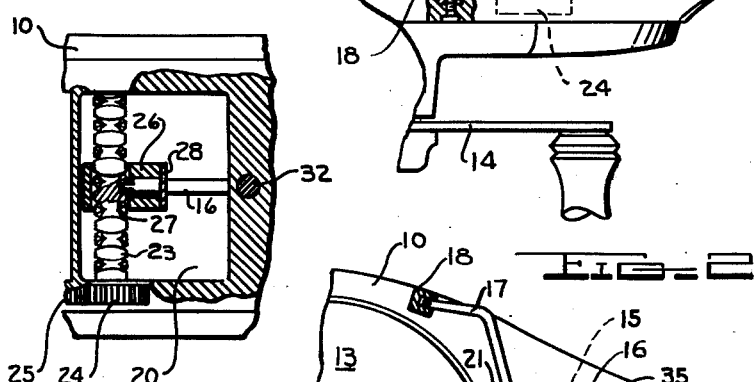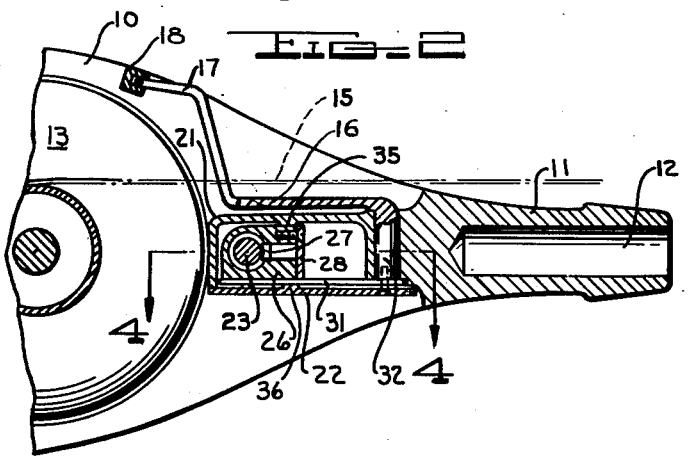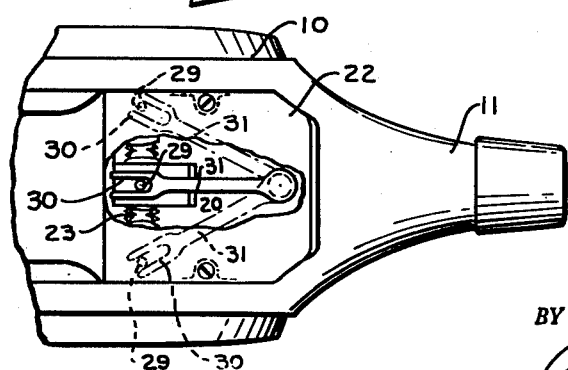
INVENTOR.
EDWIN P. HURD
BY HERBERT F. DIES
ATTORNEY Patented June 17, 1952

UNITED STATES PATENT OFFICE 2,600,774

ENCLOSED LEVEL-WIND FOR FISHING REELS

Edwin P. Hurd and Herbert F. Dies, Detroit, Mich., assignors to Hurd Lock and Manufacturing Company, Detroit, Mich., a corporation of Michigan Application June 1, 1946, Serial No. 673,760

1 Claim. (Cl. 242—84.4)

The present invention relates to a fishing reel and more particularly to an enclosed level wind mechanism for directing the fishline to the rotating spool of the reel to assure the uniform distribution and winding of the fishline over the core of the spool.

Prior to the present invention, substantially all of the so-called level wind mechanisms designed for fishing reels were of the open or exposed type, and the life of such mechanisms and the efficient operation thereof were seriously impaired by the presence of grit, sand, water, and the like in the working parts. These factors cause excessive wearing particularly of the lead screw and the follower mechanism resulting in an impairment of the operation of the reel and increasing the required repairs and the replacement of the worn parts. Since fishing reels are used under a wide variety of operating conditions, it heretofore has been a desired but unattained objective to provide a suitable enclosed type of level winding mechanism for use thereon.

It is a principal object of the present invention to provide a fishing reel having thereon a level line winding mechanism of the enclosed type.

It is a further object of the present invention to provide an enclosed type of level line winding mechanism for a fishing reel which is particularly characterized by its sturdy and durable construction and its relative simplicity, which permits the economical mass production manufacture thereof.

It is a further object of the present invention to provide a level wind mechanism for a fishing reel in which provision is made for protecting the movable parts thereof to assure a long operating life therefore. The construction being particularly adapted to permit a thorough lubrication of the moving parts while protecting the operating parts against dirt, grit, and the like abrasive substances which cause excessive wear of the operating parts.

Other objects of this invention will appear in the following description and appended claim, reference being had to the accompanying drawings forming a part of this specification wherein like reference characters designate corresponding parts in the several views.

In the drawings,

Fig. 1 is a fragmentary top plan view, partially in section, of the level wind mechanism embodying the present invention shown as a part of a fishing reel of the unitary housing type.

Fig. 2 is a fragmentary section taken substantially on the line 2—2 looking in the direction of the arrows, Fig. 1.

Fig. 3 is a bottom plan view of the fishing reel shown in Fig. 1, with a portion of the closure plate broken away to show a portion of the level wind mechanism.

Fig. 4 is a section taken substantially on the line 4—4 in the direction of the arrows, Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

It is to be understood that the enclosed level wind mechanism of the present invention may be applied to any desired type of line reeling mechanism in which a rotatable line reel is mounted in a housing. In the drawings we have shown the enclosed level wind mechanism as applied to a new type of fishing reel, the structural details of which are more fully disclosed in the co-pending application of Edwin P. Hurd, here identified as application No. 675,388, filed June 8, 1946, now Patent No. 2,578,477 dated December 11, 1951, but it is to be understood that the level winding mechanism of the present invention may be applied to other devices in which a level winding of a line on a rotatable member is desired, as for example in thread bobbin winders, winches and the like.

Since the present invention is concerned primarily with the enclosed level winding mechanism, we have deemed it advisable in the interests of simplicity not to show in this application the details of the reel mechanism itself, but have shown only those parts of the reel mechanism which are necessary to explain fully the construction and operation of the level wind mechanism of the present invention.

Referring to Fig. 1, one embodiment of the level wind mechanism embodying the present invention is there shown as embodied for use with a reel having a body housing 10 terminating in a forwardly extending nose portion 11 in which a rod-receiving recess 12 is provided. A spool 13 is mounted for rotation in the housing 10 and is connected by a gear drive (not shown) with the handle 14 for rotation therewith. Since the mounting of a spool 13 in a reel housing and the gear train mechanism for driving the spool 13 from a rotatable handle 14 is well known and is conventional construction in this art, these features of the drive mechanism are not here shown. The fishing line 15 has one end attached to the core portion of the spool 13 and is wound on the spool 13 when the spool is rotated in response to the movement of the handle 14.

In order to assure a level winding of the line 15 in successive layers on the core of the spool 13, the level winding mechanism of the present invention is provided. As here shown, the mechanism comprises a pivoting line guide 16 having an elongated eye 17 therein. The line 15 is threaded through the elongated eye 17 and as the arm 16 is moved through an arc whose ends are coincident with lines which intersect the ends of the core of the rotatable spool 13, it will be seen that the line 15 is fed to the spool 13 on a path which leads from one side of the spool 13 and then reverses its path and leads back to the point of beginning. Since the end of the arm 16 moves in an arc, an arcuate guide channel 18 is secured to the reel housing 10 to support and guide the free end of the swinging arm 16.

Swinging movement of the arm 16 is imparted thereto in synchronism with the rotation of the spool 13 by means of the drive mechanism shown in Figs. 2, 3 and 4. As here shown, the drive mechanism is enclosed in a housing which consists of a chamber 20 provided in a webbed portion 21, which, in the present instance, is formed as an integral part of the body casting 10 but which may be formed in any other suitable manner and attached or secured to the reel housing as may be desired. The lower face of the chamber 20 is covered by a removable plate 22 which permits the assembly or servicing of the mechanism enclosed within the chamber 20.

The drive mechanism for the arm 16, in the chamber 20, comprises a rotatable lead screw 23, provided with reverse cut path cam grooves or channels. The lead screw 23 is mounted for rotation in the housing 10. One end of the lead screw 23 is connected with a drive gear 24 which meshes with a driving gear 25 which is mounted for rotation upon rotation of the handle 14. A follower 26 surrounds the lead screw 23 and is provided with a depending male guide member 27 which extends into the female grooves or channels provided in the lead screw member 23. Access to the member 27 when necessary for replacement or servicing is readily provided by the removal of the removable plate 28. By this construction a uniform reciprocating rectilinear motion is imparted to the follower 26 from uniform rotary motion of the lead screw 23.

A depending pin 29 (Fig. 3) is mounted on the bottom portion of the follower 26 and engages the yoke 30 of a swinging arm 31 which is connected with a pivotal shaft 32 to which the pivoted end of the arm 16 is connected. As here shown, the shaft 32 is formed as an extension of the end of the arm 16. It is to be understood, however, that a separate shaft may be provided, to the end of which the arm 16 may be detachably connected.

While a direct mechanical connection is here shown between the arm 31 and the rotatable shaft 32, it is to be understood that other types of connections such as a segmental rack gear or the like may be utilized to provide a geared connection between the swinging arm 31 and the shaft 32.

Since the chamber 20 is an enclosed chamber, it will be seen that dirt, grit, dust, moisture and the like are effectively kept away from the operating parts of the level winding mechanism. Also the lubrication problems are greatly simplified since, if desired, the chamber 20 may be suitably packed with any desired type of lubricating medium.

The operation of the level winding mechanism of the present invention is controlled by the rotation of the lead screw 23. As the lead screw 23 is rotated in one direction, the follower member 26 travels to and fro along the cam grooves or channels provided in the lead screw 23. The to and fro movement of the follower 26 is transferred through the pin 29 and the yoke 30 to the arm 31 causing it to swing into the positions indicated in the dotted line portions of Fig. 3. The arm 31 is free to swing through an arc into such positions since the depending pin 29 is free to move relative to the yoke 30. The swinging movement of the arm 31 is translated into pivotal movement of the shaft 32 which in turn causes the arm 16 to swing to and fro through the arc necessary to feed the line 15 across the width of the spool 13. The rate of movement of the swinging arm 16 is controlled by the rate of rotation and the pitch of the cam grooves or channels of the lead screw member 23. These are design and structural factors which may be varied as desired to compensate for various speeds of spool rotation and thus to permit the incorporation of the level winding mechanism of the present invention into any desired fishing reel construction or other line winding mechanisms.

Frictional drag on the arm operating mechanism is reduced by providing a track 35 on the web 21 which contacts the housing of the follower 26 and by providing a track 36 which provides a narrow bearing surface which supports the arm 31.

The connection between the follower 26 and the end of the arm 31 may be of any suitable type which will permit swinging of the arm 31 and allow the necessary relative movement between the end of the arm 31 and the follower 26.

From the foregoing it will be seen that we have provided an enclosed level winding mechanism particularly adapted for use on fishing reels, in which the moving drive mechanism is enclosed and in which provision is made for synchronizing the line guiding member with the speed of rotation of the line spool. The mechanism is such that it can be readily adapted for economical manufacture on a mass production basis and is so constructed that service and maintenance of the mechanism is reduced to a minimum.

We claim:

A level wind mechanism adapted to feed a line to a rotary spool and comprising a pivotally mounted swinging arm, a line guide on the swinging end of said arm, an enclosed drive mechanism geared to the rotating spool and connected with said swinging arm to effect a to and fro swinging movement of said arm in synchronism with the rotation of said spool, said drive mechanism comprising a reversely threaded lead screw mounted for rotation about an axis parallel to the axis of rotation of the rotating spool, a follower mounted on said lead screw and a link operatively connected with said follower and said pivotally mounted swinging arm for translating the reciprocal motion of said follower into pivotal swinging movement of said arm, said drive mechanism being mounted in a fully enclosed housing having a top friction reducing guide rail in contact with said follower and a bottom friction reducing guide rail in contact with said link.

EDWIN P. HURD.
HERBERT F. DIES.

REFERENCES CITED

The following references are of record in the file of this patent:

UNITED STATES PATENTS

| Number | Name | Date |
|---|---|---|
| 752,786 | Leaver et al. | Feb. 23, 1904 |
| 1,438,007 | Welch | Dec. 5, 1922 |
| 1,484,906 | Russell | Feb. 26, 1924 |
| 2,244,889 | Maynes | June 10, 1941 |